(12) United States Patent
Iwasaki

(10) Patent No.: US 12,241,805 B2
(45) Date of Patent: *Mar. 4, 2025

(54) CIRCUITRY FOR REMOTE OPTICAL COMMUNICATIONS DEVICES AND METHODS UTILIZING SAME

(71) Applicant: Sean Iwasaki, Chicago, IL (US)

(72) Inventor: Sean Iwasaki, Chicago, IL (US)

( * ) Notice: Subject to any disclaimer, the term of this patent is extended or adjusted under 35 U.S.C. 154(b) by 371 days.

This patent is subject to a terminal disclaimer.

(21) Appl. No.: 17/705,879

(22) Filed: Mar. 28, 2022

(65) Prior Publication Data

US 2022/0283054 A1    Sep. 8, 2022

Related U.S. Application Data

(63) Continuation-in-part of application No. 16/839,334, filed on Apr. 3, 2020, now Pat. No. 11,290,203, which is a continuation-in-part of application No. 15/687,862, filed on Aug. 28, 2017, now Pat. No. 10,637,776.

(60) Provisional application No. 62/381,168, filed on Aug. 30, 2016.

(51) Int. Cl.
  *G01M 11/00* (2006.01)
  *H04B 10/077* (2013.01)

(52) U.S. Cl.
  CPC ........ *G01M 11/33* (2013.01); *G01M 11/3136* (2013.01)

(58) Field of Classification Search
  CPC .............. G01M 11/33; G01M 11/3136; H04B 10/0773; H04B 10/077
  See application file for complete search history.

(56) References Cited

U.S. PATENT DOCUMENTS

| | | | | |
|---|---|---|---|---|
| 5,368,041 A | * | 11/1994 | Shambroom | A61B 5/6843 128/901 |
| 9,476,795 B1 | * | 10/2016 | Cogger | G01M 11/33 |
| 2007/0086792 A1 | * | 4/2007 | Regev | H04B 10/66 398/209 |
| 2014/0016479 A1 | * | 1/2014 | Coomber | H04L 43/50 370/252 |
| 2016/0098336 A1 | * | 4/2016 | Loebig | G06F 11/3027 710/16 |
| 2022/0321218 A1 | * | 10/2022 | Sun | H04B 10/541 |

* cited by examiner

*Primary Examiner* — Harry H Kim
(74) *Attorney, Agent, or Firm* — Charles T. Riggs, Jr.

(57) ABSTRACT

The present subject matter relates to methods, systems, devices, circuitry and equipment providing for communication service to be transported between first and second networks and which monitors the communication service and/or injects test signals over two fiber cables. A first single fiber cable is used to interface the communication services between the first and second network. A second single fiber cable is used to monitor the communication services and/or inject signals. The circuitry comprises a plurality of input amplifiers, output amplifiers, and multiplexer switches between a plurality of port connectors. An SFP module is inserted in all ports, and the SFP modules connect to one or more fiber optic cables.

20 Claims, 11 Drawing Sheets

| DEVICE | SPEED | LANES | MOD | PORT | SFP DEVICE IN PORT OPERATING AT MAXIMUM OR RATED SPEED |
|---|---|---|---|---|---|
| SFP | 4Gb/s | 1 x 4Gb/s | NRZ | SFP | SFP |
| SFP+ | 10Gb/s | 1 x 10Gb/s | NRZ | SFP+ | SFP, SFP+ |
| SFP28 | 25Gb/s | 1 x 25Gb/s | NRZ | SFP28 | SFP, SFP+, SFP28 |
| SFP56 | 50Gb/s | 1 x 50Gb/s | PAM | SFP56 | SFP, SFP+, SFP28, SFP56 |
| SFP112 | 100Gb/s | 1 x 100Gb/s | PAM4 | SFP112 | SFP, SFP+, SFP28, SFP56, SFP112, SFP-DD |
| SFP-DD | 100Gb/s | 2 x 50Gb/s | PAM4 | SFP-DD | SFP, SFP+, SFP28, SFP56, SFP112, SFP-DD |
| SFP-DD112 | 200Gb/s | 2 x 100Gb/s | PAM4 | SFP-DD112 | SFP, SFP+, SFP28, SFP56, SFP112, SFP-DD, SFP-DD112 |

FIGURE 13

CIRCUITRY FOR REMOTE OPTICAL COMMUNICATIONS DEVICES AND METHODS UTILIZING SAME

RELATED APPLICATION(O)

This application is a continuation-in-part of U.S. application Ser. No. 16/839,334 entitled Circuitry for Remote Optical Communications Devices and Methods Utilizing Same, filed Apr. 3, 2020, now U.S. Pat. No. 11,290,203, which is a continuation-in-part of U.S. application Ser. No. 15/687,862 entitled Multi-functional Circuitry for Communications Networks and Methods and Devices Utilizing Same, filed Aug. 28, 2017, now U.S. Pat. No. 10,637,776, the entire disclosures of which are herein incorporated by reference.

BACKGROUND

The current communication infrastructure is an extremely complex patch of networks. The typical communication infrastructure is comprised of different service provider networks, where each service provider network is unique. Each service provider network will be comprised of different equipment and solution providers. Each service provider network will also operate and service their customers in a proprietary manner. With the 5G wireless network, the service provider must provide a higher quality and reliable communication service to their customers. The service provider will typically use an optical bridge or splitter device to monitor their communication service, but this type of device is decreasing the quality and reliability of 5G type communication services.

One such prior art optical bridge or splitter device is illustrated in the diagram of FIG. 1 (prior art), which depicts use of an "Optical Splitter" device in a communications network. An optical splitter is a passive device, which splits an optical fiber into two separate optical fibers. The optical fiber split is based upon a percentage ratio, which the ratio is dependent upon the optical splitter application. The optical splitter used for monitoring applications has a typical split ratio of 90/10, where 90% of the optical signal is passed-through. The 10% portion of the optical signal is connected to a test monitor equipment.

The optical splitter is typically connected as shown in FIG. 1 (prior art). As used therein, the reference letters "LC" represent a duplex or two fiber connectors, where each fiber connector interfaces a transmit and a received fiber cable, respectively. The LC type connector is typically used as a fiber connector for fiber communication equipment.

There are numerous disadvantages to the optical splitter design shown in FIG. 1 (prior art). First, this optical splitter requires three fiber cables (i.e. fiber cable 1, 2, & 3). Second, this optical splitter decreases or attenuates the optical signal level carried over fiber cable 1 (i.e. 90%), which decreases the operating distance of the optical signal. Third, this optical splitter design fuses two fibers to provide the split ratio. This glass fusing adds physical discontinuity to the fiber cable, where the glass fusing inherently adds impairments to the communication signal. These impairments create signal distortions, wherein these signal distortions affect the reliability of the communication signal. Fourth, this optical splitter significantly reduces the signal level of the monitored signal due to the 10% ratio. The monitored optical signal operating distance is limited.

Another known prior art signal monitoring method is illustrated in the diagram of FIG. 2 (prior art), which depicts use of two equipment nodes, the "monitoring node" and the "reflector node". The monitoring node is placed at the serving or source network and the reflector node is placed at the end of the network. As an example, the service provider will install the monitoring node at the central office type facility and the reflector node is located at the customer premise or the service provider's demarcation. The monitoring node transmits an optical signal to the reflector node, which the reflector node reflects the optical signal back to the monitoring node. The monitoring node will then analyze the reflected optical signal to determine the quality of the communication service.

This method is similarly disadvantageous. Although this method uses two fibers, it requires two proprietary equipment nodes to be installed. The monitor node is installed at the source network (i.e. central office type facility) and the reflector node is installed at the end network (i.e. demarcation). This method is very complex and cost prohibitive. This method may also add physical discontinuity to the fiber cable, where impairments and impedance mismatch are increased. These impairments create signal distortions, wherein these signal distortions can affect the reliability of the communication service.

The following prior art references provide general background information regarding the monitoring and/or testing of optical communications networks, and each are herein incorporated by reference:

U.S. Pat. No. 6,108,074 entitled Optical Switching Assembly for Testing Fiber Optic Device issued to on Aug. 22, 2000.

U.S. Pat. No. 7,787,771 B2 entitled Extendable Loop-Back Type Passive Optical Network and Scheduling Method issued to on Aug. 31, 2010.

U.S. Pat. No. 8,050,556 B2 entitled In-Band Optical Frequency Division Reflectometry issued to on Nov. 1, 2011.

U.S. Pat. No. 8,761,597 B2 entitled Monitoring Node and Reflector Node of an Optical Communication Network, Optical Network, and Method for Operating an Optical Communication Network issued to on Jun. 24, 2014.

The following paragraphs provide background information on SFP, SFP+, SFP28, SFP56, SFP112, SFP-DD, and SFP-DD112 devices and port connectors.

Small form-factor pluggable (SFP) devices are standardized, hot-pluggable devices used to provide communication services for the communication market. The SFF (Small Form Factor) Committee defines the mechanical, electrical, and software specifications of the SFP device to ensure interoperability among SFP devices and chassis. SFF Committee document INF-8074i Rev 1.0 provides the initial specifications for SFP (Small Formfactor Pluggable) Transceiver. The SFP+ (or SFP10) devices were later introduced to address higher transmission speeds. SFP devices further evolved to other variants, SFP28, SFP56, SFP-112, SFP-DD, and SFP-DD112 to address much greater speeds, while adhering to the SFP devices mechanical form factor. The SFP devices also evolved into the quad small form-factor pluggable (QSFP) devices, which is larger in mechanical size and capacity than SFP devices. The QSFP devices also had other variants, QSFP+, QSFP28, QSFP56, QSFP-DD, and QSFP-DD800 to address higher speed transmission and SFP variant applications. The octal small format pluggable (OSFP) device is still another variant to the SFP devices.

By way of further background, the SNIA SFF Technology Affiliate (TA) Small Form Factor (SFF) and various other Multi Source Agreement (MSA) Committees defines the mechanical, electrical, and software specifications of the SFP devices, their variants, and associated port connectors (edge connector and cage), and management. INF-8074i, Revision 1.0, May 12, 2001, SFP (Small Formfactor Pluggable) Transceiver provide specifications for SFP devices. SFF-8083, Revision 3.1, Sep. 13, 2014, SFP+IX 10 Gb/s Pluggable Transceiver Solution (SFP10) provide specifications for the required SFF documents to define and implement the SFP+(SFP10) and SFP+ variant devices. SFF-8402, Revision 1.1, Sep. 13, 2014, SFP+IX 28 Gb/s Pluggable Transceiver Solution (SFP28) provides the SFF specifications to define and implement a SFP28 device, SFF-8418, Revision 1.4, Jul. 30, 2015, SFP+10 Gb/s Electrical interface provide specifications for SFP+ devices. SFF-8419, Revision 1.3, Jun. 11, 2015, SFP+ Power and Low Speed interface provide specifications for SFP+ devices. SFF-8431, Revision 4.1, Jul. 6, 2009. SFP+10 G b/s and Low Speed Electrical Interface provide archived specifications for Small Form Factor Pluggable Plus (SFP+) devices. SFP-DD MSA, SFP-DD/SFP-DD112/SFP112, Revision 5.0, Oct. 1, 2021, provide hardware specifications for SFP112 and SFP Double Density (SFP-DD, SFP-DD112, SFP112) devices and their respective variants. This specification defines the electrical and optical connectors, electrical signals and power supplies, mechanical and thermal requirements of the pluggable SFP112 module, Double Density SFP-DD module, and Double Density SFP-DD112 connector and cage system.

INF-8438i, Revision 1.0, November 2006, QSFP (Quad Small Formfactor Pluggable) Transceiver provide specifications for QSFP devices. SFF-8436, Revision 4.9, Aug. 31, 2018, QSFP+ 4×10 Gb/s Pluggable Transceiver provide specifications for QSFP+ and QSFP+ variant devices. SFF-8635, Revision 0.6, Jun. 29, 2015, QSFP+ 4×10 Gb/s Pluggable Transceiver Solution (QSFP10) provide specifications for the required SFF documents to define and implement the QSFP+ (QSFP10) and QSFP+ variant devices. SFF-8661, Revision 2.5, Jun. 22, 2018, QSFP+ 4× Module provide specifications for the mechanical housing for a QSFP+ 4× and QSFP+ 4× variants devices. SFF-8665, Revision 1.9, Jun. 29, 2015, QSFP+ 28 Gb/s 4× Pluggable Transceiver Solution (QSFP28) provide specifications for the required SFF documents to define and implement the QSFP28 and QSFP28 variant devices. SFF-8679, Revision 1.8, Oct. 4, 2018, QSFP+ 4× Hardware and Electrical Specification provide specifications for the electrical requirements on QSFP+(QSFP10), QSFP28, and QSFP+ variant devices. QSFP-DD MSA, QSFP-DD/QSFP-DD800/QSFP112, Revision 6.2, Mar. 11, 2022 provide hardware specifications for QSFP Double Density (QSFP-DD) and QSFP112 pluggable devices and their variants. This specification defines and characterizes high-speed/density 4 and 8 electrical lanes (4×, 8×) modules, cage and connector system. The QSFP-D) and QSFP112 both supports up to 400 Gb/s in aggregate respectively over 8 lanes of 50 Gb/s and over 4 lanes of 100 Gb/s electrical interfaces. QSFP-DD devices doubles the number of high-speed electrical interfaces or lanes supported. The QSFP-DD800 supports up to 800 Gb/s in aggregate over 8 lanes of 100 Gb/s electrical interface. The QSFP-DD and QSFP-DD800 cage and connector designs with 8 lanes are compatible with the 4 lanes QSFP28 and QSFP112 devices. The QSFP-DD800 cage and connector is backwards compatible to 8 lanes QSFP-DD and 4 lanes QSFP28. The QSFP112 cage and connector is backwards compatible to 8 lanes QSFP-DD and 4 lanes QSFP28, QSFP+ devices and their respective variants. The QSFP-DD800 and QSFP112 supports up to 112 Gb/s (56 GBd) per lane electrical operation based on PAM4 signaling.

The QSFP-DD and QSFP-DD800 module edge connector consists of a single paddle card with 38 pads on the top and 38 pads on the bottom of the printed circuit board (PCB) assembly for a total of 76 pads. The pads are defined in such a manner to accommodate insertion of a classic QSFP+/QSFP28/QSFP112 module into a QSFP-DD and QSFP-DD800 receptacles.

OSFP MSA, OSFP Module Specification, Revision 4.1, Aug. 2, 2021 provides specifications for the OSFP device mechanical form factor, cage connector, electrical interface, thermal requirements, electrostatic discharge (ESD) requirements, and the management interface. OSFP-400 device support 8 lanes of 50 Gb/s (400 Gb/s) using 56G-PAM4 signaling. OSFP-800 device support 8 lanes of 100 Gbs (800 Gb/s) using 112G-PAM4 signaling.

SFP devices are designed to be inserted within a cage and connector, which the cage and connector are attached to the host, typically a communication equipment. INF-8074i, Revision 1.0, May 12, 2001, SFP (Small Formfactor Pluggable) Transceiver provide cage and connector specifications for SFP devices. SFF Committee document SFF-8432 Rev 5.1 SFP+ provides specifications for the SFP+ module and cage. SFF-8071, Revision 1.10, Dec. 13, 2019, SFP+IX 0.8 mm Card Edge Connector provide specifications on the 0.8 mm card edge connectors for SFP+. SFP28, and other SFP device variants. SFP-DD MSA, SFP-DD/SFP-DD112/SFP112, Revision 5.0, Oct. 1, 2021, provide cage and connector specifications for SFP112 and SFP Double Density (SFP-DD, SFP-DD112, SFP112) devices.

SFF-8682, Revision 1.1, Jun. 8, 2018, QSFP+ 4× Connector provide specifications on the physical requirements for the mating interface and physical embodiment of the 0.8 mm connector for QSFP+ and QSFP++ variant devices. SFF-8662, Revision 2.9, Jun. 8, 2018, QSFP+ 4×28 Gb/s Connector (Style A) provide specifications on the physical requirements for the mating interface and physical embodiment of the 28 Gb/s 0.8 mm connector for QSFP28 and QSFP28 variant devices. SFF-8672, Revision 1.2, Jun. 8, 2018, QSFP+ 4×28 Gb/s Connector (Style B) provide specifications on the physical requirements for the mating interface and physical embodiment of the 28 Gb/s 0.8 mm connector for QSFP28 and QSFP28 variant devices. Style B 0.8 mm connector addresses backward compatibility when mated to a connector QSFP-DD MSA, QSFP-DD/QSFP-DD800/QSFP112, Revision 6.2, Mar. 11, 2022 provide hardware specifications for QSFP Double Density (QSFP-DD) and QSFP112 pluggable devices and their variants.

SFF-8663, Revision 1.7, Oct. 19, 2017, QSFP+ 28 Gb/s Cage (Style A) provide specifications on the mechanical requirements on a 1×"n" ganged and 2×"n" stacked cage for a QSFP28 and QSFP28 variant devices. SFF-8683, Revision 1.3, Oct. 19, 2017, QSFP+ Cage provide specifications on the mechanical requirements on a 1×"n" ganged and 2×"n" stacked cage for a QSFP+ and QSFP+ variant devices. QSFP-DD MSA, QSFP-DD/QSFP-DD800/QSFP112, Revision 6.2, Mar. 11, 2022 provide hardware specifications for QSFP Double Density (QSFP-DI)) and QSFP112 pluggable devices and their variants. OSFP device mechanical form factor, cage connector, electrical interface, thermal requirements, electrostatic discharge (ESD) requirements, and the management interface. OSFP-400 device support 8 lanes of 50 Gb/s (400 Gb/s) using 56G-PAM4 signaling. OSFP-800 device support 8 lanes of 100 Gb/s (800 Gb/s) using 112G-PAM4 signaling.

Management Interface for SFP+ provides specifications for the management of SFP, SFP+, SFP28, and other SFP variant devices. This describes a register and memory map which provides alarms, warnings, vendor identity, SFP description and type, SFP real time diagnostic, and vendor specific registers. This information is to be used by the SFP host equipment. SFF-8636, Rev 2.10a, Sep. 24, 2019, Management Interface for 4-lane Modules and Cables provide specifications for the management of 4-channel pluggable transceivers (QSFP, QSFP+, QSFP28, QSFP56, and QSFP variants) and 4-channel managed external cables. Common Management Interface Specification (CMIS), Revision 5.1, Nov. 2, 2021 provide specifications for the generic management of SFP Double Density (SFP-DD), QSFP Double Density (QSFP-DD), OSFP, COBO, and QSFP devices, and their respective variants.

SUMMARY

The present disclosure relates to one or more methods, systems, devices and circuitry which allows communication service to be transported between first and second networks and which monitors the communication service over two fiber cables. A first single fiber cable is used to interface the communication services between the first and second network. A second single fiber cable is used to monitor the communication services. The method(s), system(s), device(s) and/or circuitry of the present disclosure uses a first multi-wave SFP (Small Form-factor Pluggable) device to interface the first single fiber cable and a second multi-wave SFP device to interface the second single fiber cable.

The present disclosure provides solutions to address the disadvantages and/or problematic issues with optical bridges or splitters and/or other prior art communications methods, systems and devices. The present disclosure also presents cost effective and operational efficient method(s), system(s) and device(s) in achieving and enhancing the quality and reliability of 5G and future communication services.

The methods, systems, devices and/or circuitry and equipment of the present disclosure provide functionality which:
  allows a Service Provider or user the ability to remotely monitor communication services.
  allows a Service Provider or user the ability to remotely monitor communication services and then inject communication signals.
  will not increase or add attenuation or impairments to the communication signal.
  will not require proprietary equipment at the Service Provider facility and remote or customer location.

BRIEF DESCRIPTION OF THE DRAWINGS

FIG. 13 is a table illustrating SFP Device variants, speeds, technology, and SFP port compatibility.

DETAILED DESCRIPTION

Figure 1:
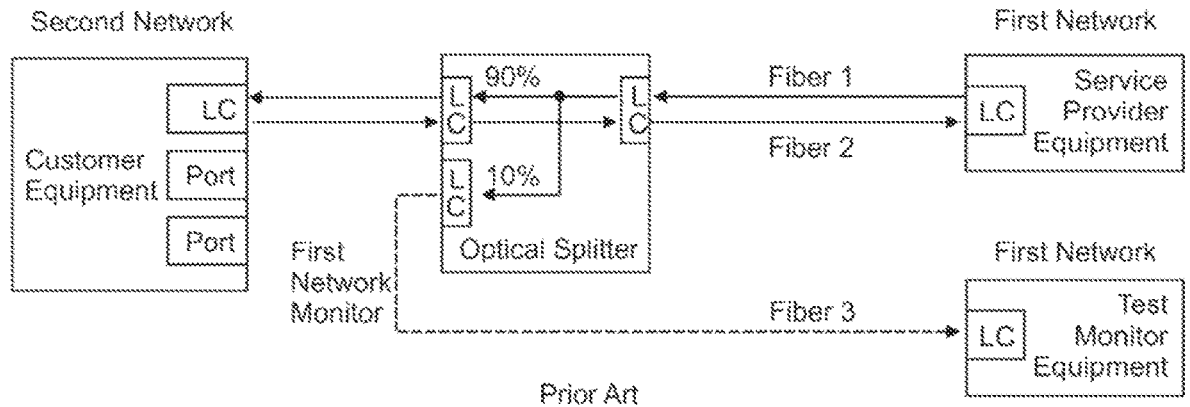
FIG. 1 is a diagram illustrating the use of a prior art optical splitter for monitoring communications network service.
Figure 2:
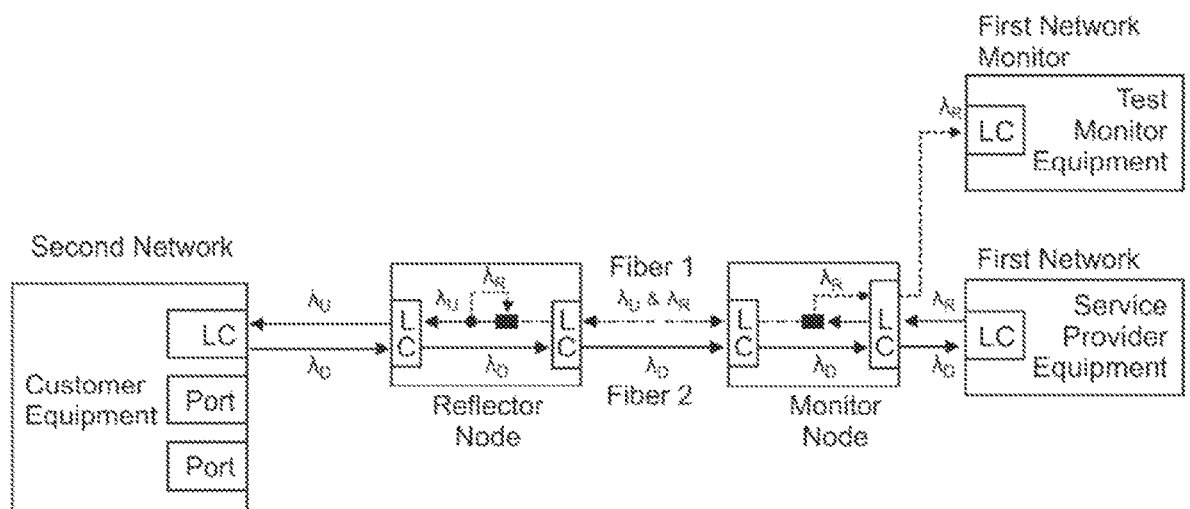
FIG. 2 is a diagram illustrating the use of a prior art Reflector and Monitor Node for monitoring communications network service.

The methods, systems, devices, circuitry and equipment of the present disclosure provide numerous advantages, novel features and/or improvements in providing various communication services for communication networks, including but not limited to providing the functionality of service monitoring via fiber cables. Discussed below and shown in the drawings are some of these advantages, novel features and/or improvements. Additional advantages, novel features and/or improvements will become apparent to those skilled in the art upon examination of the disclosure herein and the accompanying drawings, or may be learned by production or operation of the examples.

Figure 3:
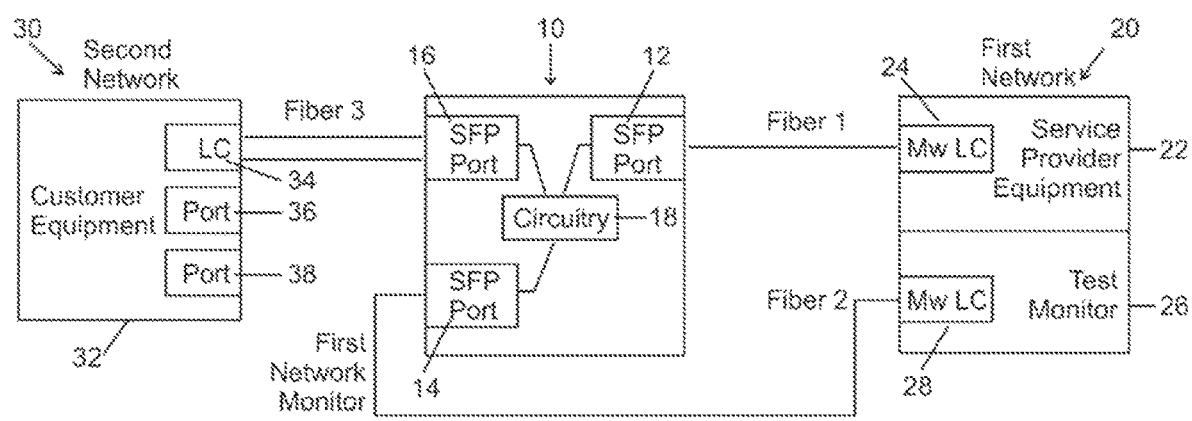
FIG. 3 is a schematic diagram illustrating an embodiment of the communications system and equipment of the present disclosure.

FIG. 3 illustrates an embodiment of the communications system and equipment of the present disclosure. The Remote Optical Communications Device 10 of the present disclosure is operatively connected between a first network 20 and a second network 30, thereby allowing communication service to be transported between first and second networks over a first single fiber cable, and to be monitored and/or injected over a second single fiber cable. The device 10 may be implemented in a mechanical form factor, for example, a network demarcation device, as shown in and described with respect to FIG. 6. It should be understood however that the presently disclosed circuitry could be implemented into other communications equipment, such as test and measurement equipment, surveillance equipment, active optical splitters, central office equipment and OSP type access panels and racks.

The first network includes service provider equipment 22 having a multi-wave fiber optic LC port 24. The first network also includes test monitor equipment 26 having a multi-wave fiber optic LC port 28. The second network includes customer premises equipment 32 having an LC fiber optic port 34 and two additional ports 36, 38. The device 10 includes multiple ports as illustrated, including two multi-wave fiber optic LC ports 12, 14, and a LC fiber optic port 16. The device 10 also has circuitry 18 which defines the signal paths between the ports of the device. The circuitry 18 is comprised of input and output differential amplifiers connected to multiplexer switches, as discussed in more detail below with respect to FIG. 5.

Figure 4:
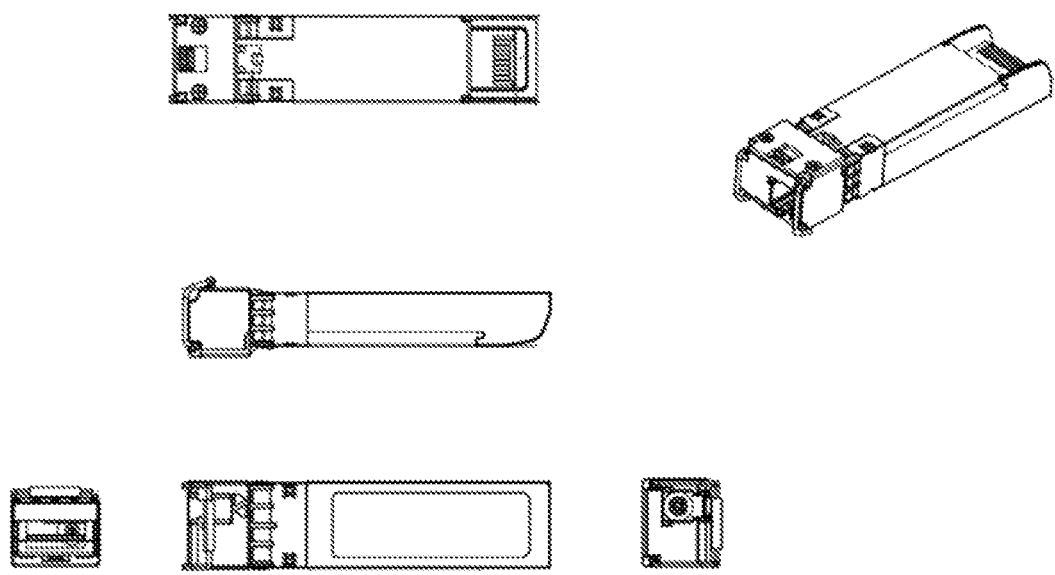
FIG. 4 is a graphical image of a multi-wave SFP device
Figure 5:
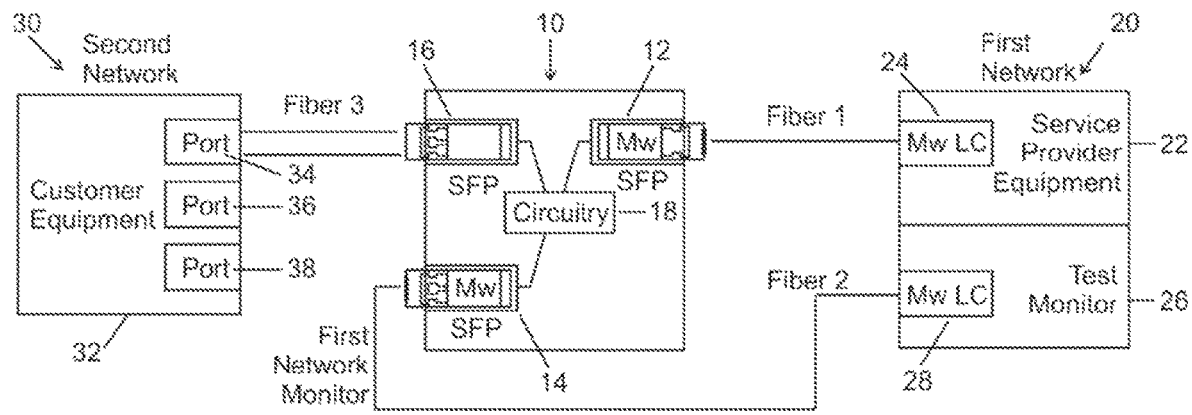
FIG. 5 is a schematic diagram illustrating an embodiment of the communications system, equipment, and SFP devices.

A first single fiber cable (Fiber 1) is used to interface the communication services between the first and second network through the device 10, specifically connecting the multi-wave fiber optic LC port 24 of the service provider equipment 22 of the first network 20 to the SFP port 12 of device 10. The device 10 in turn connects to the customer equipment 32 of the second network 30 between SFP port 16 of the device 10 and LC fiber optic port 34 of the customer equipment 32 via a two fiber cables (Fiber 3). A second single fiber cable (Fiber 2) is used to monitor and/or test the communication services, specifically connecting the multi-wave fiber optic LC port 28 of the test monitor equipment 26 of the first network 20 to the SFP port 14 of device 10. The communications device 10 thereby interfaces to the first network 20 via the Fiber 1 cable, and monitors signal from the first network 20 and/or injects a test signal to the first network 20 via the Fiber 2 cable. A multi-wave SFP device (illustrated in FIG. 4) is plugged into each multi-wave LC port 12, 14, 24 and 28, to interface the Fiber 1 cable and the Fiber 2 cable between the respective multi-wave LC ports as illustrated in FIG. 5. Similarly, SFP modules are inserted in the LC ports 16 and 34.

Figure 6:
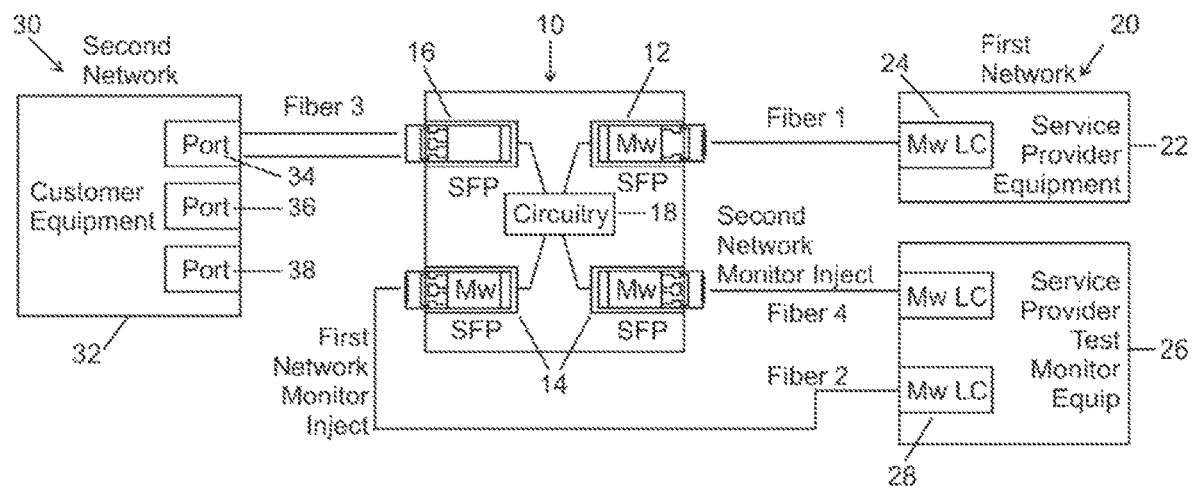
FIG. 6 is a schematic diagram illustrating the communication equipment of the present disclosure providing the functionality of monitoring signals from and injecting into first and second network each using a single fiber cable.

FIG. 6 illustrates one embodiment of the present disclosure in the form of a remote optical communication monitor and test device and system, which may be used in "dark fiber" applications. A dark fiber or unlit fiber is an unused optical fiber, available for use in fiber-optic communication. Dark fiber may be leased from a network service provider.

With respect to monitoring, the methods, circuitry and equipment of the present disclosure provide the ability and functionality of injecting and cut-thru using dark fiber. The user has the flexibility to provide injecting and cut-thru in the SFP port 1, SFP port 4, or both ports. In FIG. 6, the SFP port 3 monitors, injects, or cut-thru signals via the single Fiber 2 cable through the SFP port 1 by means of one single fiber cable, Fiber 1 to the Service Providers Equipment, as schematically illustrated in FIG. 6.

As illustrated in FIG. 6, Primary UpLink corresponds to the connection with the First Network service provider equipment, Primary DownLink corresponds to the connection with the Second Network customer equipment, Primary UpLink Monitor/Inject corresponds to the connection with the First Network Monitor/Inject or Test Monitor equipment, and Primary DownLink Monitor/Inject (FIG. 7) corresponds to the connection with a Second Network Monitor/Inject or Test Monitor equipment (not shown).

This system permits the transport of signals from a first network, and the monitor of a signal from said first network. The system also permits the transport of signals from a first network, the monitor of a signal from said first network, and the injection of a signal to the first network. The system further permits the transport of signals from a first network, the monitor of a signal from said first network, and the injection of a signal to the first network at the demarcation.

The following paragraphs disclose the use of new SFP variants, SFP+, SFP28, SFP56, and SFP112 devices and port connectors on the embodiment 10 illustrated in FIGS. 3, 5, and 6. These SFP variants are referred as 1 channel or lane.

The SFP devices in embodiment 10 as illustrated in FIGS. 3, 5 and 6 can be alternatively replaced by SFP variant devices defined as SFP, SFP+, SFP28, SFP56, and SFP112. These SFP variant devices are configured as a single channel or lane operation for each direction. The SFP ports in embodiment 10 are comprised of cage and connectors appropriate for the SFP device rated operation. The Table of FIG. 13 illustrates SFP ports recommended backward compatibility with SFP devices operating at rated or maximum speed. A SFP28 port can accommodate a SFP28, SFP+ and SFP devices. A SFP28 port may accommodate a SFP56 or SFP112 devices operating at the 25 Gb/s or 10 Gb/s, but the SFP28 port will not support the SFP56 and SFP112 devices operating at 50 Gb/s and 100 Gb/s, respectively. The SFP28 port was not designed to operate at higher speeds whose signal spectral density is higher than the SFP28 port's ability. The SFP28 port will introduce signal impairments to the communication signal when SFP56 and SFP112 devices are operating at their maximum or nominal rate. As disclosed herein, SFP56, SFP112, and other newer variants may interoperate with lower rated SFP ports using higher signal modulations such as PAM8 and PAM16 and SFP devices with lower power dissipation. The higher signal modulation allows the signal spectral density content to be lower than a non-return to zero (NRZ) signal modulation at the same bit rate. In other words SFP56 devices with PAM4 modulation will have the ability to operate in a SFP28 port. SFP Devices in this embodiment can provide different media interfaces such as RJ45, Coax, SC, LC, Duplex LC, MPO-12, SN-Dual, MDC-Dual, and PCB traces. The multi-wave fiber optic and fiber X ports in this embodiment are defined as having an SC, LC, Duplex LC, MPO-12, SN-Dual, or MDC-Dual connector.

Figure 7:
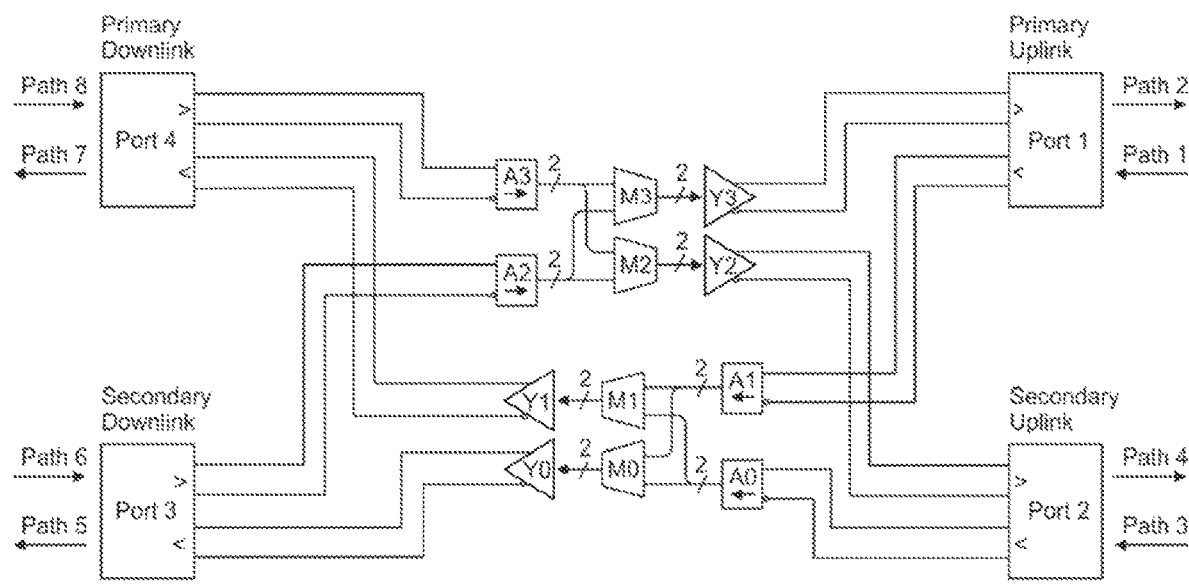
FIG. 7 is a schematic diagram illustrating one embodiment of the circuitry of the present disclosure.

Referring to FIG. 7, schematic diagram illustrating one embodiment of the circuitry of the present disclosure, representing for example a communication device with a plurality of port connectors, which are each connected to an input and output differential amplifier, wherein the differential amplifier connects to a multiplexer switch. The communication device first port connector Port 1 interface signals from a first network. The communication device second port connector Port 2 is configured to monitor a signal from the first network. The second port connector port 2 is also configured to monitor a signal from the first network and inject a signal to the first network. The communication device third port connector Port 3 is configured to interface signals from a second network. The communication device fourth port connector Port 4 is configured to monitor a signal from a second network. The fourth port connector Port 4 is also configured to monitor a signal from a second network and inject a signal to the second network. Further, a SFP module is inserted in all ports. These SFP modules connect to one or more fiber cables.

More specifically, FIG. 7 illustrates a block diagram of circuitry of the present disclosure involving four ports; Port 1, Port 2, Port 3, and Port 4 and eight differential signal paths. Port 1 has two differential signal paths, P1 and P2. Port 2 has two differential signal paths P3 and P4. Port 3 has two differential signal paths P5 and P6. Port 4 has two differential signal paths P7 and P8.

There are four input broadband differential amplifiers A0, A1, A2, and A3. The broadband differential amplifiers provide amplification and conditioning of the input signal. There are four multiplexer switches M0, M1, M2, and M3. The multiplexer switches functions as a crosspoint switch, demultiplexer, or multiplexer for routing the signals. There are four high speed output differential amplifiers Y0, Y1, Y2, and Y3. The high speed output differential amplifiers provide fixed or variable output voltages with and without pre-emphasis. The high speed output differential amplifiers Y0, Y1, Y2, and Y3 each include a retimer.

Port 1 comprises a Path P1 representing an input differential signal and a Path P2 representing an output differential signal. Port 2 comprises a Path P3 representing an input differential signal and a Path P4 representing an output differential signal. Port 3 comprises a Path P6 representing an input differential signal and a Path P5 representing an output differential signal. Port 4 comprises a Path P8 representing an input differential signal and a Path P7 representing an output differential signal.

Path P1 input differential signals connect to the input differential amplifier A1. The output signal from differential amplifier A1 can be a differential or common-mode signal. This output signal from differential amplifier A1 connects to the input of Multiplexer Switch M1 and M0.

Path P2 output differential signals connect to the output differential amplifier Y3. The input signal to differential amplifier Y3 can be a differential or common-mode signal. This input signal to differential amplifier Y3 connects to the output of Multiplexer Switch M3.

Path P3 input differential signals connect to the input differential amplifier A0. The output signal from differential amplifier A0 can be a differential or common-mode signal. This output signal from differential amplifier A0 connects to the input of Multiplexer Switch M0 and M1.

Path P4 output differential signals connect to the output differential amplifier Y2. The input signal to differential amplifier Y2 can be a differential or common-mode signal. This input signal to differential amplifier Y2 connects to the output of Multiplexer Switch M2.

Path P5 output differential signals connect to the output differential amplifier Y0. The input signal to differential amplifier Y0 connects to the output of Multiplexer Switch M0.

Path P6 input differential signals connect to the input differential amplifier A2. The output signal from differential amplifier A2 can be a differential or common-mode signal. This output signal from differential amplifier A2 connects to the input of Multiplexer Switch M2 and M3.

Path P7 output differential signals connect to the output differential amplifier Y1. The input signal to differential amplifier Y1 connects to the output of Multiplexer Switch M1.

Path P8 input differential signals connect to the input differential amplifier A3. The output signal from differential amplifier A3 can be a differential or common-mode signal. This output signal from differential amplifier A3 connects to the input of Multiplexer Switch M3 and M2.

Figure 8:
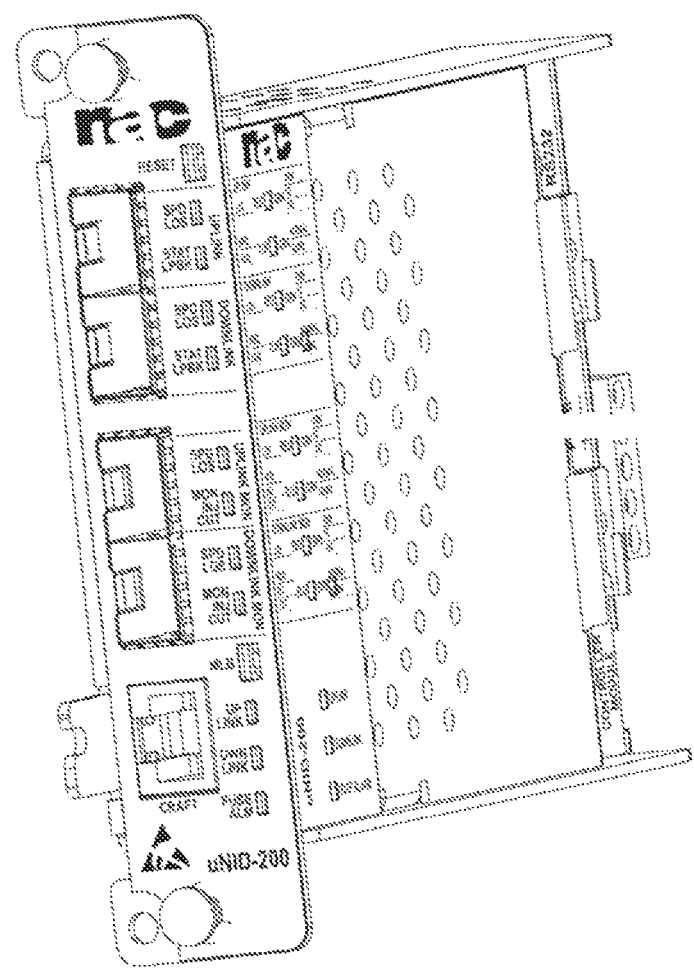
FIG. 8 is a perspective view of an embodiment of the mechanical form factor of the communications device of the present disclosure.

FIG. 8 illustrates a front perspective view of an embodiment of an exemplary communication equipment of the present disclosure. As illustrated, on a front plate, four SFP ports are aligned or positioned in a two by two, front to front orientation. Also on the front plate, an RJ45 jack provides an RS232 craft interface for communication equipment and service status, and equipment provisioning. As illustrated, a top cover is used to protect the electronic circuit assembly. The top cover provides LED indicators for equipment and service status when the communication equipment is horizontally installed on a wall.

FIGS. 9, 10, 11, 12 and 13 disclose another embodiment 40 and associated circuitry 18b relating to the use of SFP-DD (double density) and SFP-DD112 devices. Circuitry 18b comprises double the circuitry 18. Also disclosed is a passive optical network (PON) application for embodiments 10 and 40.

SFP-DD devices double the number of connections of SFP, SFP+, SFP28, and SFP56 devices. SFP-DD devices are referred as 2 channel or lane devices. SFP is a single channel or 1 lane device. SFP-DD is a dual channel or 2 lane device. QSFP is a four channel or 4 lane device. QSFP-DD is an eight channel or 8 lane device. OSFP is an eight channel or 8 lane device.

Due to its small and portable physical size. SFP Devices have expanded in specifications to address other applications. SIP Devices are represented as SFP, SFP+, SFP28, SFP56, SFP112, SFP-DD, SFP-DD112, QSFP, QSFP+, QSPF28, QSFP56, QSFP-DD, QSFP-DD, QSFP-DD800, OSFP, OSFP800, and all other current and future SFF, MSA, SFP-DD, QSFP-DD, and OSFP technologies. The SFP-DD Devices in embodiment 40 discussed below can be alternatively replaced by various other SFP Devices which support multiple lanes and channel. These SFP Devices with multiple lanes and channels are defined QSFP, QSFP+, QSPF28, QSFP-DD, QSFP-DD112, OSPF, OSFP800, and future SFP Devices with multiple channels or lanes.

Figure 9:
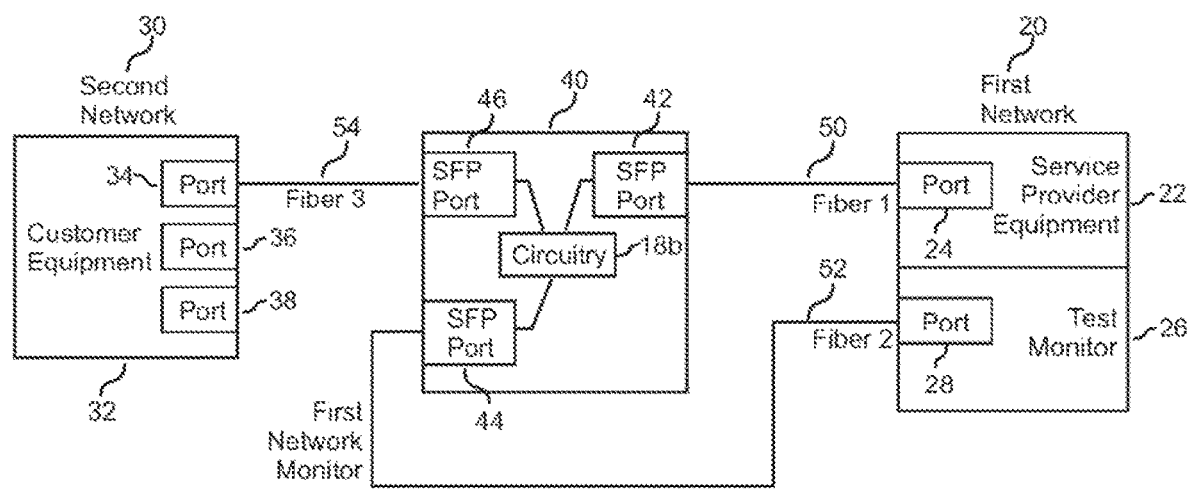
FIG. 9 is a schematic diagram illustrating another embodiment of the communications system and equipment of the present disclosure.
Figure 10:
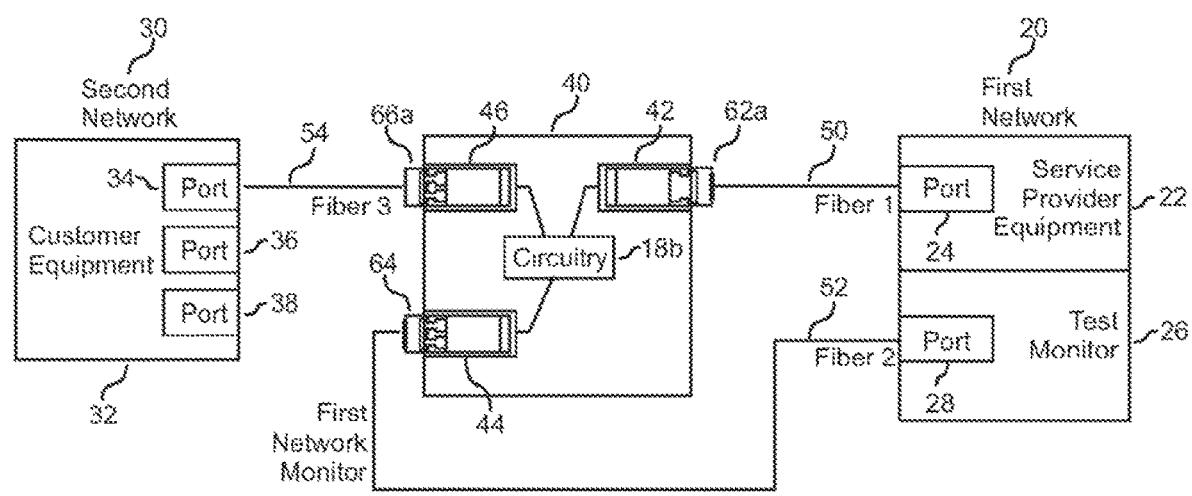
FIG. 10 is a schematic diagram illustrating another embodiment of the communications system, equipment, and SFP devices
Figure 11:
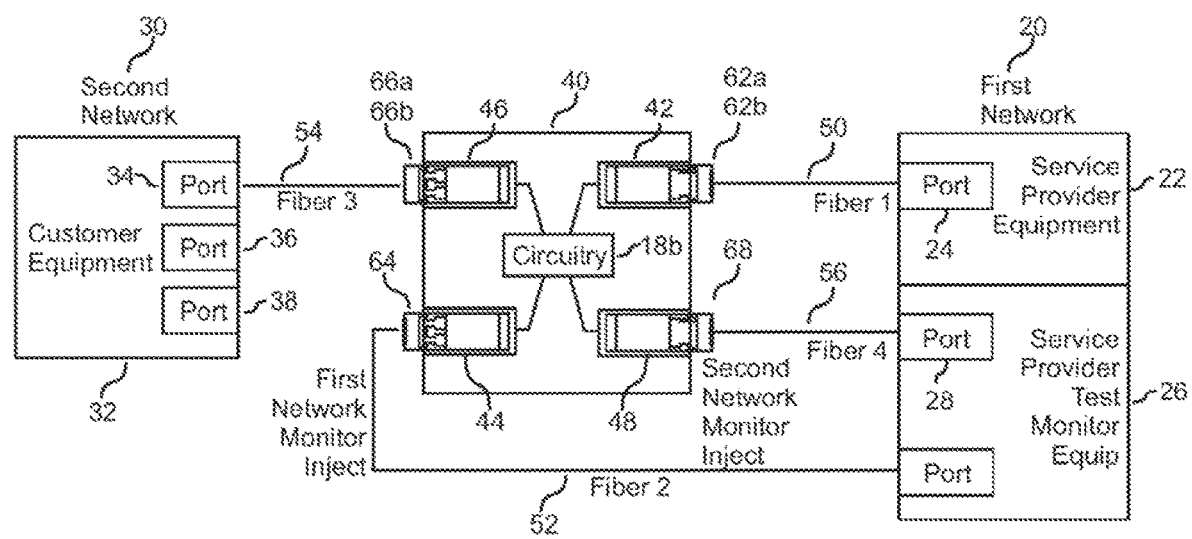
FIG. 11 is a schematic diagram illustrating the communication equipment of another embodiment of the present disclosure providing the functionality of monitoring signals from and injecting into first and second network each using a single fiber cable

The SFP-DD devices in embodiment 40 in FIGS. 9, 10, and 11 are defined as SFP-DD, SFP-DD112, and future SFP-DD variants. SFP-DD devices can be alternatively replaced by SFP variant devices defined as SFP, SFP+, SFP28, SFP56, SFP112, SFP-DD, and SFP-DD112 in SFP-DD ports. SFP-DD devices doubles the number of high-speed electrical interfaces or lanes supported. These SFP-DD variant devices are configured as a dual channels or lanes for each direction. SFP-DD supports up to 100 Gb/s in aggregate over a 2×50 Gb/s electrical interface. SFP112 supports 100 Gb/s over single electrical lane, and SFP-DD112 supports up to 200 Gb/s in aggregate over a 2×100 Gb/s electrical interface. The SFP-DD ports in embodiment 40 are comprised of cage and connectors appropriate for the SFP-DD devices and SFP variant device. Table 1 illustrates SFP-DD and SFP-DD112 ports recommended backward compatibility with SFP variant devices, SFP, SFP+, SFP28, SFP56, SFP112, SFP-DD, and SFP-DD112. A SFP28 port may accommodate a SFP-DD or SFP-DD112 devices operating at the 25 Gbs or 10 Gb/s using a single lane, but the SFP 28 port will not support the SFP-DD and SFP-DD112 devices operating at 100 Gb/s and 200 Gb/s, respectively using 2 lanes. The SFP28 port was not designed to operate at higher speeds whose signal spectral density is higher than the SFP28 port's ability. The SFP28 port will introduce signal impairments to the communication signal when SFP56 and SFP112 devices are operating at their maximum or nominal rate. As disclosed herein, SFP56, SFP112, and other newer variants may interoperate with lower rated SFP ports using higher signal modulations such as PAM8 and PAM16 and SFP devices with lower power dissipation. The higher signal modulation allows the signal spectral density content to be lower than a non-return to zero (NRZ) signal modulation at the same bit rate. In other words, for example, SFP56 devices with PAM4 modulation will have the ability to operate from 1 Gb/s-56 Gb/s in, for example, a SFP28 port operating at 25 Gb/s, or in a SFP+(SFP10) port operating at 10 Gb/s, etc. SFP-DD devices in this embodiment can provide different media fiber optic interfaces such SC, LC, Duplex LC, MPO-12, SN-Dual, MDC-Dual, and PCB traces.

FIG. 9 illustrates an embodiment of the communications system and equipment of the present disclosure. The Remote Optical Communications Device 40 of the present disclosure is operatively connected between a first network 20 and a second network 30, thereby allowing communication service to be transported between first and second networks over a first single fiber cable, and to be monitored and/or injected over a second single fiber cable. The device 40 may be implemented in a mechanical form factor, for example, a network demarcation device, as shown in and described with respect to FIG. 6 and a passive optical network (PON) element, as shown in and described with respect to FIG. 11. It should be understood however that the presently disclosed circuitry could be implemented into other communications equipment, such as test and measurement equipment, surveillance equipment, active optical splitters, central office equipment and OSP type access panels and racks. The multi-wave fiber optic and fiber X ports are defined as having an LC, Duplex LC, MPO-12, SN-Dual, or MDC-Dual connector. SFP ports in this embodiment are SFP-DD ports, which can accept other SFP variant devices as illustrated in Table 1. The SFP-DD devices in embodiment 40 can be alternatively replaced by SFP variant devices defined as SFP, SFP+, SFP28, SFP56, and SFP112.

The first network includes service provider equipment 22 having a fiber optic port 24. The first network also includes test monitor equipment 26 having a fiber optic port 28. The second network includes customer premises equipment 32 having a fiber optic port 34 and two additional ports 36, 38. The device 40 includes multiple ports as illustrated, including three SFP-DD ports 42, 44, and 46. The device 40 also has circuitry 18b which defines the signal paths between the ports of the device. The circuitry 18b is comprised of input and output differential amplifiers connected to multiplexer switches, as discussed in more detail below with respect to FIG. 12.

A first single fiber cable 50 (Fiber 1) is used to interface the communication services between the first and second network through the device 40, specifically connecting the fiber optic port 24 of the service provider equipment 22 of the first network 20 to the SFP-DD port 42 of device 40. The device 40 in turn connects to the customer equipment 32 of the second network 30 between SFP-DD port 46 of the device 40 and fiber optic port 34 of the customer equipment 32 via a fiber cable 54 (Fiber 3). A second single fiber cable 52 (Fiber 2) is used to monitor and/or test the communication services, specifically connecting the fiber optic port 28 of the test monitor equipment 26 of the first network 20 to the SFP-DD port 44 of device 40. The communications device 40 thereby interfaces to the first network 20 via the Fiber 1 cable 50, and monitors signal from the first network 20 and/or injects (transmits) or cut-thru (transmit and receive) test signal to the service provider equipment 22 of the first network 20 via the Fiber 2 cable 52. A SFP-DD device 62a is plugged into SFF-DD port 42 to interface cable 50 Fiber 1. A SFP-DD device 64 is plugged into SFF-DD PORT 44 to interface cable 52 Fiber 2 as illustrated in FIG. 10. Similarly, SFP-DD device 66a is inserted in SFP-DD port 46 to interface cable 54 Fiber 3, specifically connecting the fiber optic port 34 of the customer equipment 32 of the second network 30.

FIG. 11 illustrates one embodiment of the present disclosure in the form of an optical line terminal (OLT) or and optical network unit (ONU) functionality with remote optical communication monitor and test capabilities for passive optical network (PON) applications. A passive optical network (PON) is a broadband point-to-multipoint architecture where a single fiber from a service provider can provide an effective method to provide high speed broadband connections to multiple end users. PON technology has evolved to XGS-PON (ITU G.9807.1) and NG-PON2 (ITU-T G.98). In a PON application, the embodiments 10 and 40 will provide optical line terminal (OLT), an optical network unit (ONU), an optical network terminal (ONT), and optical distribution network (ODN), optical wavelength coverter (OWC), an optical repeater (OR), or an optical test equipment (OTE) functionality with monitoring and test capabilities. The embodiment 10 can be an OLT device by inserting an OLT SFP (OLT SFP+, OLT SFP28, OLT SFP56, OLT SFP112, or OLT variant SFP) device into SFP port 16, inserting a wavelength division multiplexing (WDM) SFP device into each SFP port 12, 14, and 18, as illustrated in FIG. 5. The embodiment 40 can be an OLT device by inserting an OLT SFP-DD (OLT SFP-DD, OLT SFP-DD112, or OLT SFP-DD variant) device 66b into SFP-DD port 46, inserting a dense wavelength division multiplexing (DWDM) SFP-DD device 62a into SFP DD port 42, inserting a DWDM SFP-DD devices 64 and 68 into SFP-DD ports 44 and 48, respectively as illustrated in FIG. 11. The embodiment 10 can be an ONU device by inserting an ONU SFP (ONU SFP+, ONU SFP28, ONU SFP56, ONU SFP112, or ONU SFP variant) device into SFP port 12, inserting a WDM SFP device into each SFP port 14, 16 and 18, as illustrated in FIG. 5. The embodiment 40 can be an ONU device by inserting an ONU SFP-DD variant (ONU SFP-DD, ONU SFP-DD112) device 62b into SFP-DD port 42, inserting a DWDM SFP-DD device 66a into SFP DD port 46, inserting a DWDM SFP-DD devices 64 and 68 into SFP-DD ports 44 and 48, respectively as illustrated in FIG. 11.

Figure 12:
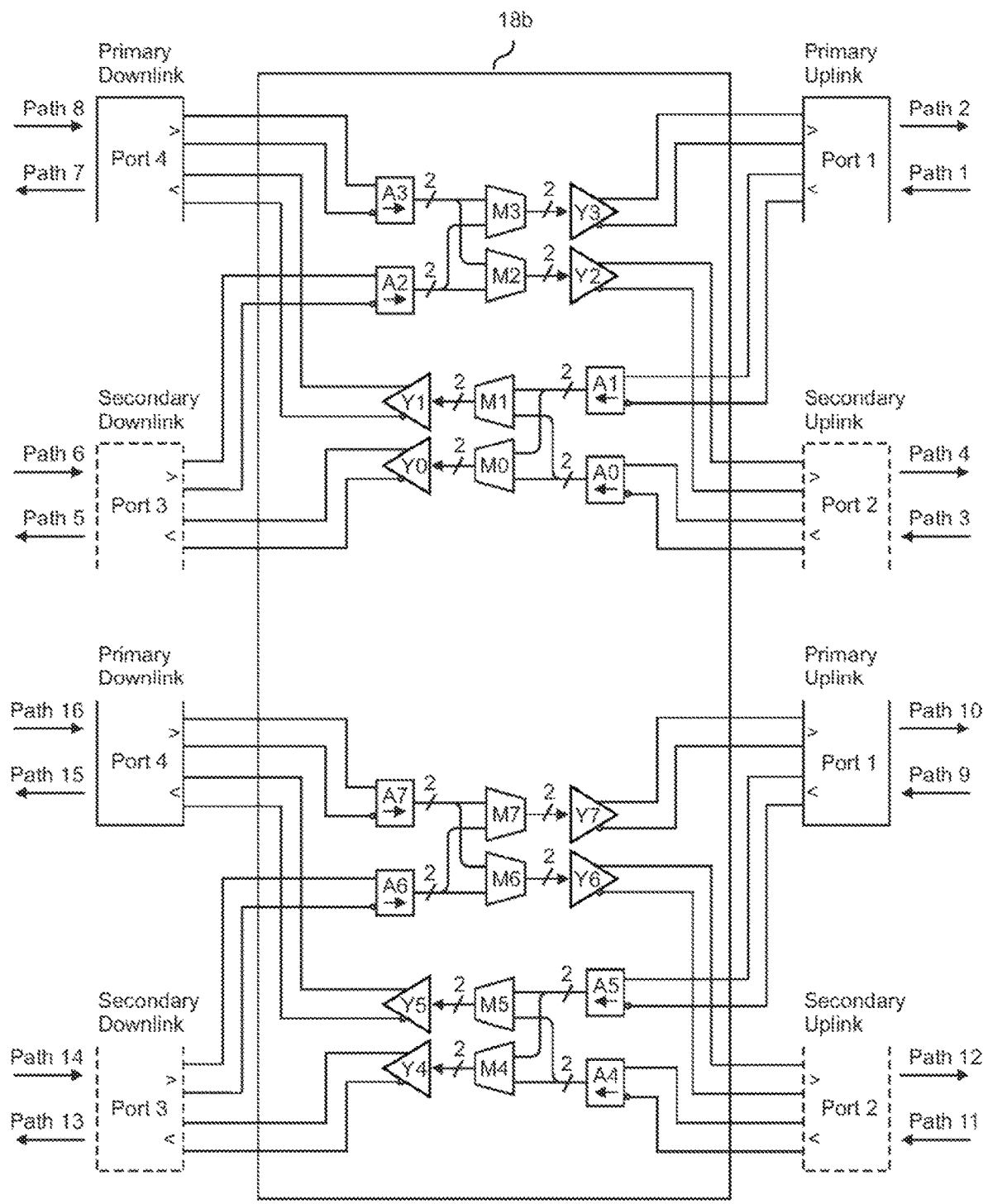
FIG. 12 is a schematic diagram illustrating another embodiment of the circuitry of the present disclosure.

With respect to monitoring, the methods, circuitry and equipment of the present disclosure provide the additional ability and functionality of injecting and cut-thru using a single fiber cable. The user has the flexibility to provide injecting and cut-thru in the SFP-DD port 44, SFP-DD port 48, or both ports. In FIG. 11, the SFP-DD port 44 monitors, injects, or cut-thru signals via the single Fiber 2 cable through the SFP-DD port 42 by means of one single fiber cable 50, Fiber 1 to the Service Providers Equipment, as schematically illustrated in FIG. 12. The SFP-DD port 48 monitors, injects, or cut-thru signals via the single Fiber 4 cable 56 through the SFP-DD port 46 by means of fiber cable 54, Fiber 3 to the Customer Equipment, as schematically illustrated in FIG. 12.

As illustrated in FIG. 12, Primary UpLink corresponds to the connection with the First Network service provider equipment, Primary DownLink corresponds to the connection with the Second Network customer equipment, Primary UpLink Monitor/Inject corresponds to the connection with the First Network Monitor/inject or Test Monitor equipment, and Primary DownLink Monitor/Inject (FIG. 12) corresponds to the connection with a Second Network Monitor/Inject or Test Monitor equipment (not shown).

This system permits the transport of signals from a first network, and the monitor of a signal from said first network. The system also permits the transport of signals from a first network, the monitor of a signal from said first network, and the injection of a signal to the first network. The system further permits the transport of signals from a first network, the monitor of a signal from said first network, and the injection of a signal to the first network.

Referring to FIG. 12, schematic diagram illustrating one embodiment of the circuitry of the present disclosure, representing for example a communication device with a plurality of port connectors, which are each connected to an input and output differential amplifier, wherein the differential amplifier connects to a multiplexer switch. The communication device first port connector Port 1 interface signals from a first network. The communication device second port connector Port 2 is configured to monitor a signal from the first network. The second port connector port 2 is also configured to monitor a signal from the first network and inject a signal to the first network. The communication device third port connector Port 3 is configured to interface signals from a second network. The communication device fourth port connector Port 4 is configured to monitor a signal from a second network. The fourth port connector Port 4 is also configured to monitor a signal from a second network and inject a signal to the second network. Further, a SFP-DI) device is inserted in all ports. These SFP-DD device connect to one or more fiber cables.

More specifically, FIG. 12 illustrates a block diagram of circuitry of the present disclosure involving four ports; Port 1. Port 2, Port 3, and Port 4 and sixteen differential signal paths. Port 1 has four differential signal paths, P1, P2. P9, and P10. Port 2 has four differential signal paths P3, P4, P11, and P12. Port 3 has four differential signal paths P5, P6, P13, and P14. Port 4 has four differential signal paths P7, P8, P15, and P16.

There are eight input broadband differential amplifiers A0, A1, A2, A3, A4, A5, A6, and A7. The broadband differential amplifiers provide amplification and conditioning of the input signal. There am eight multiplexer switches M0, M1, M2, M3, M4, M5, M6, and M7. The multiplexer switches functions as a crosspoint switch, demultiplexer, multiplexer, or fanout for routing the signals. There are eight high speed output differential amplifiers Y0, Y1, Y2, Y3, Y4, Y5, Y6, and Y7. The high speed output differential amplifiers provide fixed or variable output voltages with and without pre-emphasis. The high speed output differential amplifiers Y0, Y1, Y2, Y3. Y4, Y5, Y6, and Y7 can include a retimer if the SFP device does not have an internal retimer.

Port 1 comprises a Path P1 representing an input differential signal and a Path P2 representing an output differential signal. Port 2 comprises a Path P3 representing an input differential signal and a Path P4 representing an output differential signal. Port 3 comprises a Path P6 representing an input differential signal and a Path P5 representing an output differential signal. Port 4 comprises a Path P8 representing an input differential signal and a Path P7 representing an output differential signal.

Path P1 input differential signals connect to the input differential amplifier A1. The output signal from differential amplifier A1 can be a differential or common-mode signal. This output signal from differential amplifier A1 connects to the input of Multiplexer Switch M1 and M0.

Path P2 output differential signals connect to the output differential amplifier Y3. The input signal to differential amplifier Y3 can be a differential or common-mode signal. This input signal to differential amplifier Y3 connects to the output of Multiplexer Switch M3.

Path P3 input differential signals connect to the input differential amplifier A0. The output signal from differential amplifier A0 can be a differential or common-mode signal. This output signal from differential amplifier A0 connects to the input of Multiplexer Switch M0 and M1.

Path P4 output differential signals connect to the output differential amplifier Y2. The input signal to differential amplifier Y2 can be a differential or common-mode signal. This input signal to differential amplifier Y2 connects to the output of Multiplexer Switch M2.

Path P5 output differential signals connect to the output differential amplifier Y0. The input signal to differential amplifier Y0 connects to the output of Multiplexer Switch M0.

Path P6 input differential signals connect to the input differential amplifier A2. The output signal from differential amplifier A2 can be a differential or common-mode signal. This output signal from differential amplifier A2 connects to the input of Multiplexer Switch M2 and M3.

Path P7 output differential signals connect to the output differential amplifier Y1. The input signal to differential amplifier Y1 connects to the output of Multiplexer Switch M1.

Path P8 input differential signals connect to the input differential amplifier A3. The output signal from differential amplifier A3 can be a differential or common-mode signal. This output signal from differential amplifier A3 connects to the input of Multiplexer Switch M3 and M2.

Path P9 input differential signals connect to the input differential amplifier A5. The output signal from differential amplifier A5 can be a differential or common-mode signal. This output signal from differential amplifier A5 connects to the input of Multiplexer Switch M4 and M5.

Path P10 output differential signals connect to the output differential amplifier Y7. The input signal to differential amplifier Y7 can be a differential or common-mode signal. This input signal to differential amplifier Y7 connects to the output of Multiplexer Switch M7.

Path P11 input differential signals connect to the input differential amplifier A4. The output signal from differential amplifier A4 can be a differential or common-mode signal. This output signal from differential amplifier A4 connects to the input of Multiplexer Switch M4 and M5.

Path P12 output differential signals connect to the output differential amplifier Y6. The input signal to differential amplifier Y6 can be a differential or common-mode signal. This input signal to differential amplifier Y6 connects to the output of Multiplexer Switch M6.

Path P13 output differential signals connect to the output differential amplifier Y4. The input signal to differential amplifier Y4 connects to the output of Multiplexer Switch M4.

Path P14 input differential signals connect to the input differential amplifier A6. The output signal from differential amplifier A6 can be a differential or common-mode signal. This output signal from differential amplifier A6 connects to the input of Multiplexer Switch M6 and M7.

Path P15 output differential signals connect to the output differential amplifier Y5. The input signal to differential amplifier Y5 connects to the output of Multiplexer Switch M5.

Path P16 input differential signals connect to the input differential amplifier A7. The output signal from differential amplifier A7 can be a differential or common-mode signal. This output signal from differential amplifier A7 connects to the input of Multiplexer Switch M7 and M6.

As discussed above, the present disclosure describes a method to transport signals from a first network via a first fiber cable and monitor the signal via a second fiber cable. The present disclosure also describes a method to transport signals from a first network via a first fiber cable and monitor the signal and inject a signal to first network via a second fiber cable. The present disclosure further describes a method at a network demarcation to transport signals from a first network via a first fiber cable and monitor the signal and inject a signal to the first network via a second fiber cable.

These methods comprise one or more of the following steps. A first small pluggable form factor SFP module is inserted into the device first port connector. The small pluggable form factor SFP module is an optical wave divisional multiplexer. A second small pluggable form factor SIP module is inserted into the device second port connector. The small pluggable form factor SFP module is an optical wave divisional multiplexer. A third small pluggable form factor SFP module is inserted into the device third port connector. A fourth small pluggable form factor SFP module is inserted into the device fourth port connector.

The device first port connector interfaces with the first network. The device second port connector interfaces with the first network. The device third port connector interface with the second network. The device fourth port connector interfaces with first or second network. In such a configuration, and with the above described circuitry and fiber cables, the functionality described herein is achieved.

More specifically, the circuitry, devices, systems, methods and equipment described herein will allow a Service Provider or user the ability to transport or deliver communication service and remotely monitor said communication service using a single (one) fiber cable, respectively. In other words, a single (one) fiber cable is used to transport and receive communication service and a single (one) fiber cable is used to monitor the communication service.

Further, the circuitry, devices, systems, methods and equipment described herein will allow a Service Provider or user the ability to transport or deliver communication service and remotely monitor the communication service and then inject signals using a single (one) fiber cable without disrupting the monitored communication service. A single (one) fiber cable is used to transport and receive communication service and a single (one) fiber cable is used to monitor said communication service, perform loopback testing, inject signals, and full signal cut-through.

The circuitry, devices, systems, methods and equipment described herein will help the Service Provider or user ensure quality of service for the fiber communication service by monitoring said communication service.

The circuitry, devices, systems, methods and equipment described herein will significantly decrease or eliminate the Service Provider's labor cost (i.e. truck roll) in deploying staff to troubleshoot the communication service due to the implementation of a single (one) fiber cable for transport and a single (one) fiber cable for monitoring.

The circuitry, devices, systems, methods and equipment described herein allows the Service Provider or user the ability to monitor and inject services without the need for two proprietary equipment.

The circuitry, devices, systems, methods and equipment described herein will allow a Service Provider to use any media and manufacturer type of multi-wave optical (CWDM, DWDM, PON) small form factor pluggable devices.

The circuitry, devices, systems, methods and equipment described herein provides a cost-effective solution to remotely monitor and then inject communication signals or signals through a first fiber cable and second fiber cable, respectively.

While the embodiment(s) disclosed herein are illustrative of the structure, function and operation of the exemplary method(s), circuitry, equipment and device(s), it should be understood that various modifications may be made thereto with departing from the teachings herein. Further, the components of the method(s), circuitry, equipment and device(s) disclosed herein can take any suitable form, including any suitable hardware, software, circuitry or other components capable of adequately performing their respective intended functions, as may be known in the art. It should also be understood that all commercially available parts identified herein can be interchanged with other similar commercially available parts capable of providing the same function and results.

While the foregoing discussion presents the teachings in an exemplary fashion with respect to the disclosed method(s), circuitry, equipment, and device(s) for communication services, it will be apparent to those skilled in the art that the present disclosure may apply to other method(s), system(s), device(s), equipment and circuitry for communication services.

Further, while the foregoing has described what are considered to be the best mode and/or other examples, it is understood that various modifications may be made therein and that the subject matter disclosed herein may be implemented in various forms and examples, and that the method(s), system(s), device(s), equipment and circuitry may be applied in numerous applications, only some of which have been described herein.

What is claimed is:

1. Communication equipment circuitry for a communication device interfacing a Passive Optical Network PON having a first network and a second network, comprising:
    a plurality of Small Form-factor Pluggable SFP port connectors each adapted to receive a Small Form-factor Pluggable SFP variant device and connect to at least a single fiber optic cable interface;
    a plurality of input differential amplifiers;
    a plurality of multiplexer switches; and
    a plurality output differential amplifiers;
    wherein the circuitry defines a plurality of differential signal paths between the plurality of Small Form-factor Pluggable SFP port connectors;
    wherein the plurality of multiplexer switches are selective determinative of the differential signal paths between an input path of each Small Form-factor Pluggable SFP port connector and an output path of each of at least two other Small Form-factor Pluggable SFP port connectors through one input differential amplifiers, and simultaneously two multiplexer switches and two output differential amplifiers.

2. The circuitry of claim 1, wherein a first port connector defines a first path representing an input differential signal and a second path representing an output differential signal.

3. The circuitry of claim 2, wherein a second port connector defines a third path representing an input differential signal and a fourth path representing an output differential signal.

4. The circuitry of claim 3, wherein a third port connector defines a fifth path representing an output differential signal and a sixth path representing an input differential signal.

5. The circuitry of claim 4, wherein a fourth port connector defines a seventh path representing an output differential signal and an eighth path representing an input differential signal.

6. The circuitry of claim 1, wherein at least one of the plurality of Small Form-factor Pluggable SFP port connectors is a Small Form-factor Pluggable—Double Density SFP-DD port adapted to receive a Small Form-factor Pluggable—Double Density SFP-DD device and connect to at least one fiber optic cable.

7. The circuitry of claim 1, wherein each of the plurality of Small Form-factor Pluggable SFP port connectors are adapted to have backward compatibility with Small Form-factor Pluggable SFP variant devices operating at rated or maximum speed.

8. The circuitry of claim 1, wherein the media interface is one of a SC (Subscriber/Square Connector) type connector, LC (Lucent Connector) type connector, Duplex LC type connector, MPO (Multi-Fiber Push On)-12 type connector, SN (Senko Nano)-Dual type connector, or MDC (Mini Duplex Connector—USCONNEC Trademark "MDC")-Dual type connector.

9. The circuitry of claim 1, wherein the circuitry is adapted to provide at least one of service monitoring, service protection switching, redundancy, on-demand service, security, testing, troubleshooting and service upgrades.

10. A communication device for a Passive Optical Network PON having an Optical Line Terminal OLT device or an Optical Network Unit ONU, comprising:

a plurality of Small Form-factor Pluggable SFP port having Small Form-factor Pluggable SFP variant devices; and circuitry defining a plurality of differential signaling paths between the ports, wherein the circuitry comprises a plurality of input differential amplifiers, a plurality of multiplexer switches, and a plurality output differential amplifiers;

wherein the plurality of differential signal paths provide at least one of service monitoring and signal injecting via at least a single fiber optic cable;

wherein the plurality of multiplexer switches are selective determinative of the differential signal paths between an input path of each Small Form-factor Pluggable SFP port connector and an output path of each of at least two other Small Form-factor Pluggable SFP port connectors through one input differential amplifiers, and simultaneously two multiplexer switches and two output differential amplifiers.

11. The device of claim 10, wherein a first port defines a first path representing an input differential signal and a second path representing an output differential signal.

12. The device of claim 11, wherein a second port defines a third path representing an input differential signal and a fourth path representing an output differential signal.

13. The device of claim 12, wherein a third port defines a fifth path representing an output differential signal and a sixth path representing an input differential signal.

14. The device of claim 13, wherein a fourth port defines a seventh path representing an output differential signal and an eight path representing an input differential signal.

15. The device of claim 10, wherein each of the plurality of ports are Small Form-factor Pluggable SFP ports adapted to have backward compatibility with Small Form-factor Pluggable SFP variant devices operating at rated or maximum speed.

16. The device of claim 10, wherein at least one of the plurality of Small Form-factor Pluggable SFP ports is a Small Form-factor Pluggable—Double Density SFP-DD port adapted to receive a Small Form-factor Pluggable—Double Density SFP-DD device and connect to at least two fiber optic media interfaces.

17. The device of claim 16, wherein the media interface is one of a SC (Subscriber/Square Connector) type connector, LC (Lucent Connector) type connector, Duplex LC type connector, MPO (Multi-Fiber Push On)-12 type connector, SN (Senko Nano)-Dual type connector, or MDC (Mini Duplex Connector—USCONNEC Trademark "MDC")-Dual type connector.

18. The device of claim 10, further comprising a processor, retimers, timing LED indicators, a status and provisioning interface, and power management.

19. The device of claim 10, wherein the device is one of monitoring equipment, a network interface device, a router and an Ethernet switch.

20. A method of providing monitoring services in Optical Line Terminal OLT or Optical Network Unit ONU communication equipment, comprising the steps of:

providing a communication device having a plurality of Small Form-factor Pluggable SFP ports having Small Form-factor Pluggable SFP variant devices;

providing in the communication device circuitry defining a plurality of differential signaling paths between the ports;

connecting a first port of the communication device to a first network service provider equipment via a first single fiber cable;

connecting a second port of the communication device to a first network test monitor equipment via a second single fiber cable;

providing at least one of service monitoring and signal injecting via the second single fiber cable; and selectively determining the differential signaling paths between an input path of each Small Form-factor Pluggable SFP port and an output path of at least two other Small Form-factor Pluggable SFP ports simultaneously though one input differential amplifier, two multiplexer switches and two output differential amplifiers.

* * * * *